United States Patent [19]

Horsrud et al.

[11] Patent Number: 5,522,311
[45] Date of Patent: Jun. 4, 1996

[54] BEVERAGE CONTAINER COMPACTING DEVICE HAVING ENDLESS BELTS WITH PUNCTURING MEMBERS

[75] Inventors: Johan Horsrud, Manstad; Åsmund Dagslet, Spikkestad, both of Norway

[73] Assignee: Tomra Systems A/S, Asker, Norway

[21] Appl. No.: 440,007

[22] Filed: May 12, 1995

[51] Int. Cl.⁶ .................................. B30B 5/06; B30B 9/32
[52] U.S. Cl. .......................... 100/50; 100/98 R; 100/152; 100/902
[58] Field of Search ............................ 100/50, 53, 98 R, 100/152, 902

[56] References Cited

U.S. PATENT DOCUMENTS

| 1,598,364 | 8/1926 | Cassell et al. | 100/902 |
| 1,609,523 | 12/1926 | McLauglin | 100/98 R |
| 3,691,942 | 9/1972 | Wagley | 100/902 |
| 4,501,198 | 2/1985 | Johansson et al. | 100/902 |
| 4,995,314 | 2/1991 | Buer | 100/902 |
| 5,355,788 | 10/1994 | Phinney | 100/902 |

FOREIGN PATENT DOCUMENTS

| 4122130 | 1/1993 | Germany | 100/152 |
| 5-318191 | 12/1993 | Japan | 100/902 |

*Primary Examiner*—Stephen F. Gerrity
*Attorney, Agent, or Firm*—Rodman & Rodman

[57] ABSTRACT

A device for compacting empty beverage containers of metal or plastics is provided with a substantially wedge formed container receiving space. Compactor elements subject the container to gradually increasing compacting forces as it moves through the container receiving space. The container is then engaged and punctured by puncturing elements as the container moves through the container receiving space. The compactor elements include a pair of mutually inclined, cooperative endless belts of a flexible material having a container engageable front surface and a rear side. The engaging and puncturing elements include a plurality of metal studs provided in the front surface of each of the belts along the length thereof.

13 Claims, 3 Drawing Sheets

BEVERAGE CONTAINER COMPACTING DEVICE HAVING ENDLESS BELTS WITH PUNCTURING MEMBERS

The present invention relates to a device for compacting empty beverage containers of metal or plastics, said device comprising a substantially wedge formed container receiving space, compactor means for subjecting said container to gradually increasing compacting forces as it moves through said space, and means for engaging and puncturing said container as it moves through said space.

It has over the years been desirable to provide an improvement over the prior art compacting devices of the type mentioned above. It has in particular been desirable to provide a compacting device which does not crush bottle spouts. The latter is important in the context of avoiding colour mixture in case bottles of different colour are compacted and are to be recycled. Also, it has been desirable to provide a compacting device of capable compacting several types of empty beverage containers of various shapes and materials (e.g. steel, aluminium or plastics) and with said device powered by a single electric motor.

Further, the prior art compacting devices frequently exhibit the disadvantage of Jamming in case hard objects have been put into the containers before compacting.

Furthermore, it has also been a long-felt need for such compacting devices to have an improved gripping and puncturing capacity in order to have a more controlled compacting operation. This is important in view of the fact that the prior art compacting devices have insufficient puncturing capacity to enable trapped air to escape during the compacting action.

The present invention therefore has as a primary object to overcome the disadvantages of the prior art devices.

According to the present invention, said compactor means is a pair of mutually inclined, co-operated endless belts of a flexible material having a container engageable front surface and a rear side, and said means for engaging and puncturing being a plurality of metal studs provided in said front surface of each of said belts along the length thereof.

According to further embodiments of said device, said endless belts of flexible material are suitably made from reinforced rubber or rubber-like material.

Counter-force means are suitably located at said rear side of each of said belts, said counter-force means preferably being of a roller type. Said counter-force means suitably comprise a single roller located at the rear side of a first belt of said pair of belts, and a pair of rollers located at the rear side of the second belt of said pair of belts.

According to another embodiment of said device, at least one of said counter-force means is resiliently suspended. Suitably, said resiliently suspended counter-force means is mounted on a supportive bracket in common with one of said endless belts, said bracket being operatively coactive with overload or compacting force detecting device.

According to still another embodiment of said device, each of said belts has a tread pattern of longitudinal arrays of tread block formed by longitudinal and transverse grooves in the belt material. A plurality of said tread blocks have one or more of said metal studs provided therein.

The invention is now to be further described with reference to the enclosed drawing figures illustrating a non-limitative embodiment of the present invention.

Figure 1:
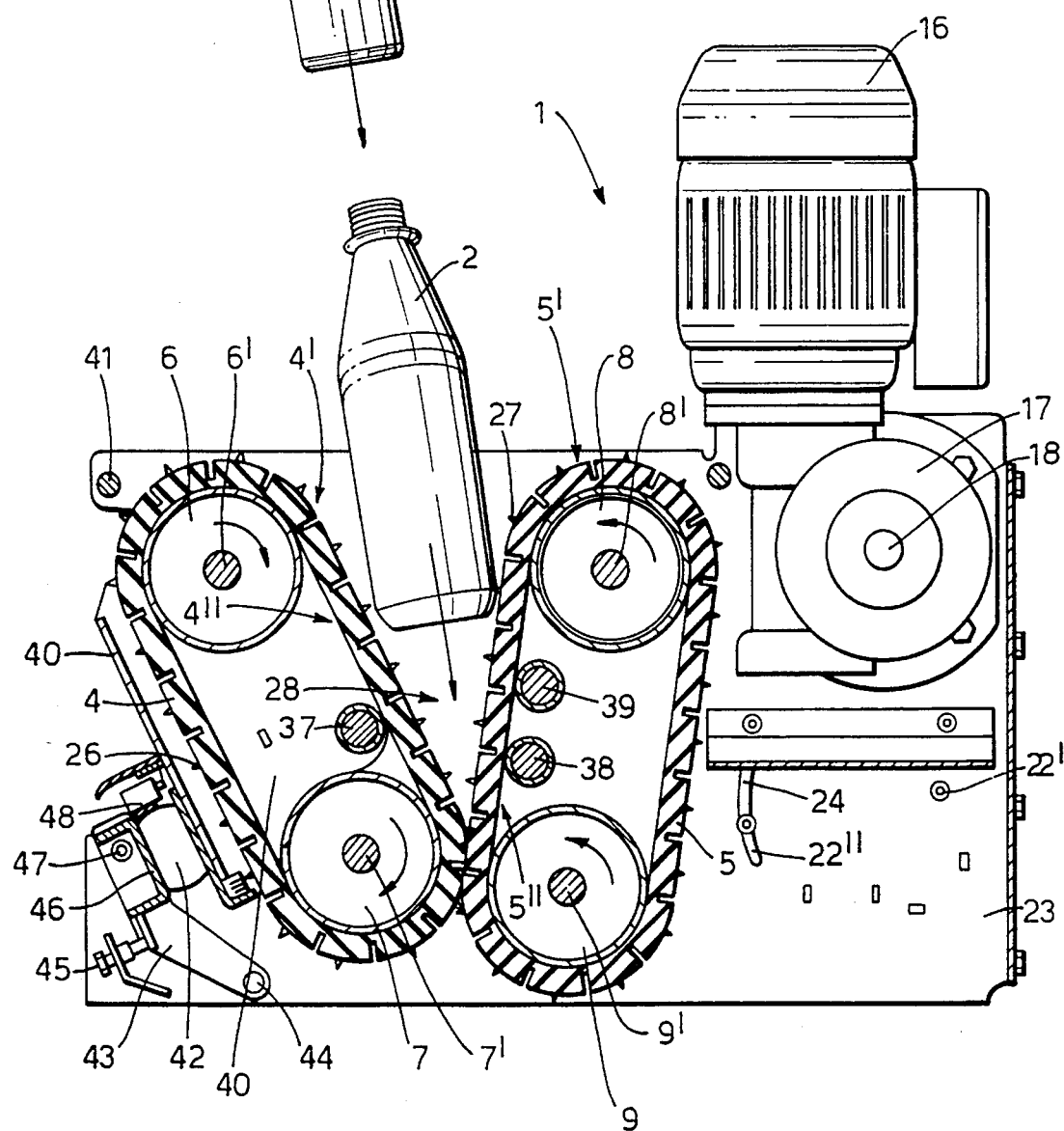
FIG. 1 is a front-view of the device, according to the present invention, shown in partial section.

FIG. 1 shows a typical device for compacting empty beverages containers. Such containers could be bottles 2 of plastics, e.g. PET-type bottles, or metal cans 3, suitably of aluminium.

The compacting device 1 has compactor means in the form of a pair of mutually inclined endless belts 4, 5 of a flexible material having a container engageable front side 4', 5' respectively, and a rear side 4", 5", respectively. The flexible belt material is suitably reinforced rubber or rubber-like material. The belt 4 is suspended by means of rotatable rollers 6 7 rotating in a clockwise direction, as seen in FIG. 1. Similarly, the belt 5 is suspended by means of a pair of rollers 8, 9 rotating in an anti-clockwise direction, as seen in FIG. 1. The roller 5 has a drive shaft 6', the roller 7 has a drive shaft 7', the roller 8 has a drive shaft 8' and the roller 9 has a drive shaft 9'.

Figure 2:
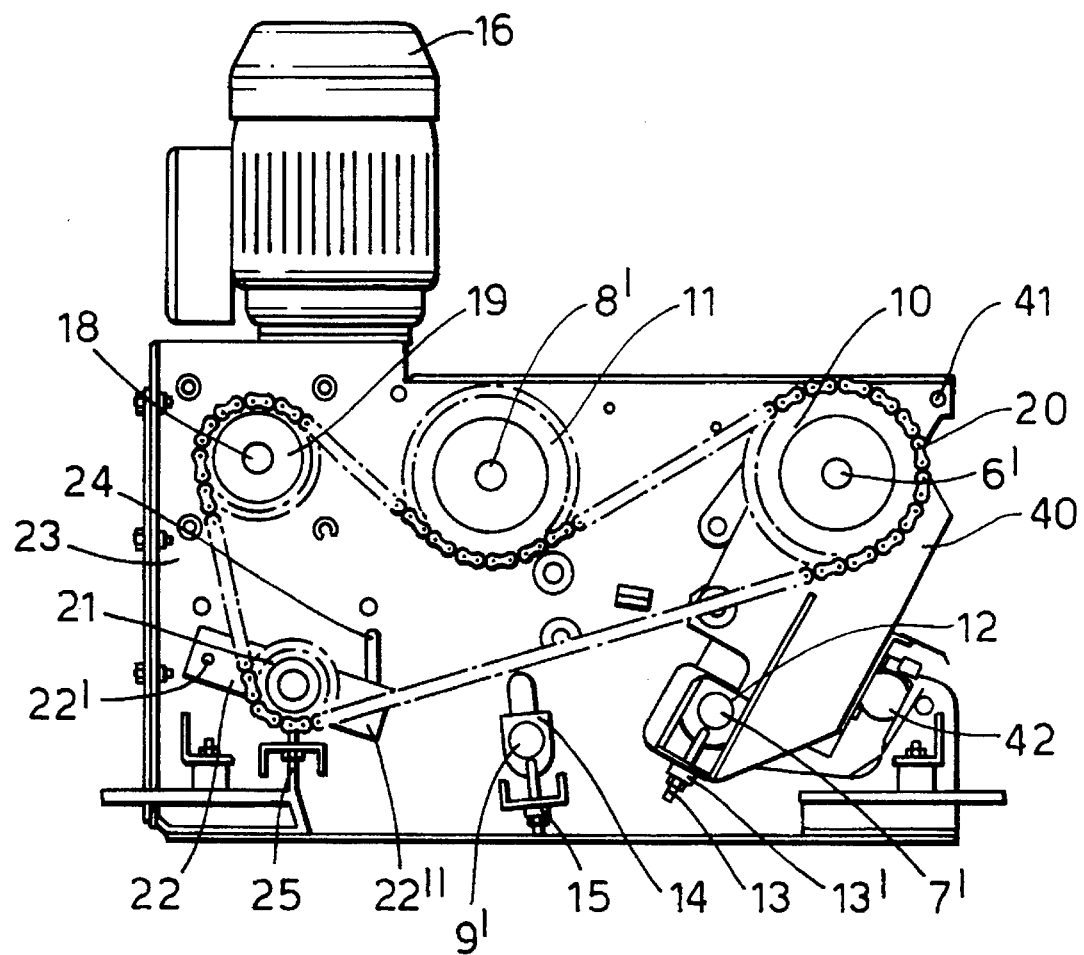
FIG. 2 is a rear view of the device according to the present invention.

As seen from FIG. 2, the shaft 5' is attached to a gear 10. Similarly, the shaft 8' is attached to a gear 11. The shaft 7' is supported in a bearing 12, the bearing 12 being provided with bolt and nut means 13 for adjusting the tensioning of the belt 4. Suitably, said means 13 may be provided with resilient means, e.g. a compressible spring 13'. Similarly, the shaft 9' may be supported in a bearing 14, said bearing 14 being provided with belt tensioning means 15 of the same type as that shown and described in connection with said means 13, said belt tensioning means 15 suitably also having resilient means like the means 13'. Said belts 4, 5 are co-operated by means of a common electric motor 16, having a transmission housing 17, including a motor drive shaft 18, said motor drive shaft 18 connected to a gear 19 as shown on FIG. 2. The gear 19 is operatively interconnected with gears 10 and 11 by means of a drive chain 20, as shown in FIG. 2. Further, the chain 20 is arranged to run over a further gear 21, said gear 21 being rotatably mounted on a bracket 22. The bracket 22 has one end 22' thereof pivotably connected to a device wall 29, and its other end 22" in slidable engagement with a slot 24 in said wall 23. Chain tensioning device 25 is linked with bracket 22 and has bolt and nut means for tensioning said chain 20.

Figure 3:
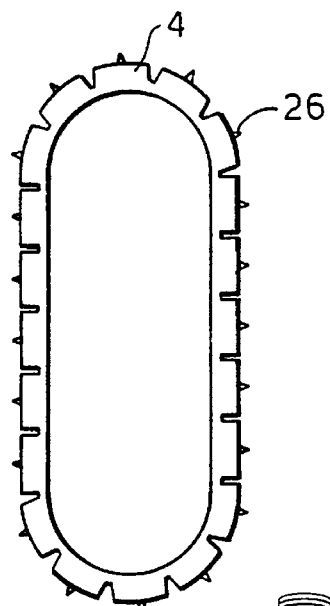
FIG. 3 is a side view of an endless belt used with the device, according to the invention.

As clearly seen from FIG. 1 the belt 4 is provided with a plurality of studs 26 and the belt 5 is provided with a plurality of studs 27. These studs are suitably of metal and have been partly embedded or inserted in said belts of flexible material in order to engage and simultaneously puncture the container 2; 3 as it enters the substantially wedge formed container receiving space 28 provided between said belts 4 and 5. Said studs 26 and 27 are provided in the front surface 4' and 5' respectively, of said belts 4 and 5 along the length thereof. The structure of belts 4, 5 is to be further described with reference to the enclosed FIGS. 3 and 4. For the sake of simplicity, only belt 4 is described in connection with FIGS. 3 and 4. However, it should be kept in mind that belt 5 with its studs is of identical nature.

Figure 4:
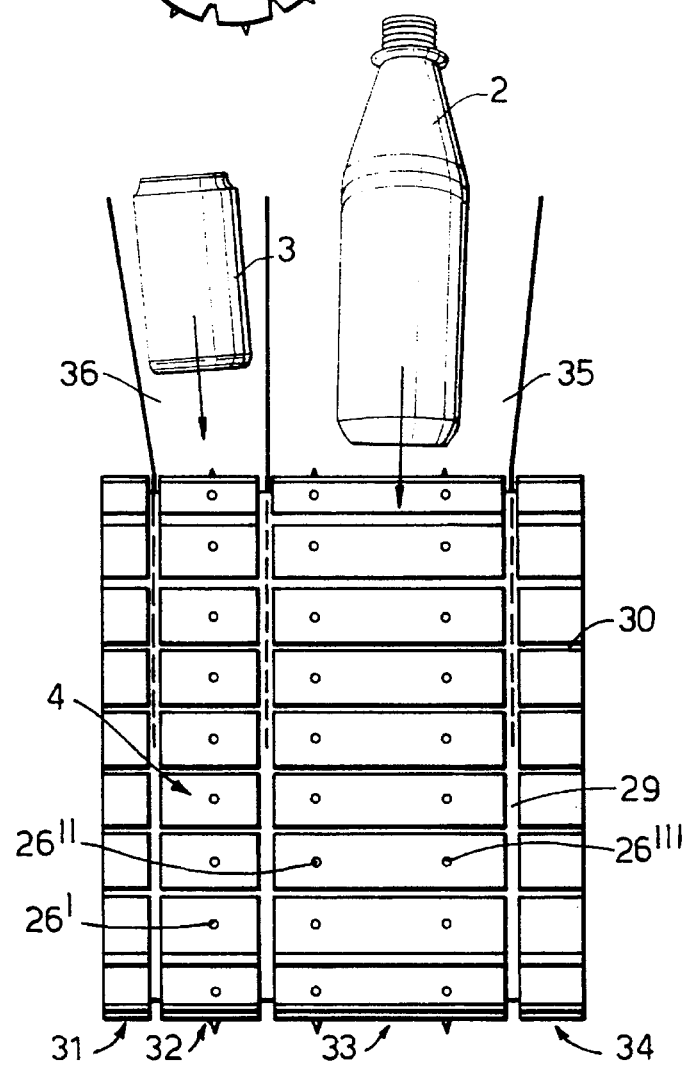
FIG. 4 is a front view of an endless belt used with the device, according to the invention.

The belt 4 as shown in FIG. 4 has a typical tread pattern formed by longitudinal grooves 29 and transverse grooves 30 in the belt material, thus forming longitudinal arrays of tread blocks 31, 32, 33 and 34, as shown in the example of FIG. 4. However, it may readily be appreciated that a different tread pattern could be created e.g. by having further longitudinal grooves 29. As shown schematically in FIG. 4 the present device could be used for compacting both bottles 2 and cans 3 simultaneously by providing inlet chutes 35 and 36, respectively, the section 32 with studs 26' being assigned to the cans 3, and section 33 with studs 26" and 26'" being assigned to the compacting of plastic bottles 2. In order to provide sufficient compressive and thus compacting force on the containers to be compacted, counter-force means are located at the rear side 4" and 5" of said endless belts, respectively. In the embodiment shown on FIG. 1 the belt 4 has a single counter-force roller 37. At the rear side 5" of the second belt 5, there is provided a pair of counter-force rollers 38 and 39. In the non-limitative embodiment shown, it should be noted that neither the rollers 8, 9, nor the counter-force rollers 38 and 39 are displaceable, apart from rotation, relative to the wall 23. However, upon inspection of both FIG. 1 and 2, it will be noted that the assembly of the rollers 5, 7, as well as roller 37 is mounted on a supportive bracket 40 which is pivotally connected to the device wall 23 at pivot point 41.

Thus, when a container enters the space 28 and is gradually subjected to increasing compacting forces due to the narrowing space, the roller 7 with the associated belt 4 will be moved slightly to the left in order to provide sufficient space for the compacted container to exit at the lowermost end of the wedge formed space 28. However, upon said movement of said roller 7 as well as roller 37 to the left, as simultaneously the common supportive bracket 40 moves to the left about the pivot point 41, said motion is resiliently opposed by resilient means 42, e.g. spring or rubber ball means acting between said bracket 40 and an arm 43 which is pivotally connected to the wall 23 at a pivot point 44. The angular position of the arm relative to the pivot point 44 is adjustable by means of a set screw assembly 45. The resilient means 42 bears against a profiled member 46 which is connected to the arm 43 by means of bolt and nut means 47. Thus, it will be understood that the space in the lowermost gap between the belts 4 and 5 will be decided by the resilient means 42 and the set point of the arm 43 as determined by said set screw assembly 45. Upon compacting of a container, the resilient means 42 will be gradually compressed. If the compression becomes too excessive, a micro switch 48 located between the upper end of the arm 43 and a part of the bracket 40 will operate, causing the motor 16 to halt or turn the belts in opposite direction in order to allow the defective container or foreign object to be removed by hand. This is particularly useful whenever some foreign object enters the space 28 or the container contains some foreign object which is not to be compressed.

Although the present device has been described in connection with a particular preferred embodiment of the invention, any expert in the art will readily understand that modifications are possible within the scope of the invention, without departing from the inventive concept.

Having described our invention, we claim:

1. A device for compacting empty beverage containers formed of metal or plastic material, said device comprising a substantially wedge formed container receiving space, compactor means for subjecting said container to gradually increasing compacting forces as it moves through said space, and means for engaging and puncturing said container as it moves through said space, said compactor means being a pair of mutually inclined, operating endless belts of a flexible material having a container engageable front surface and a rear side, and said means for engaging and puncturing being a plurality of metal studs provided in said front surface of each of said belts along the length thereof.

2. A device according to claim 1, wherein said endless belts of flexible material are made of rubber or rubber.

3. A device according to claim 1, further comprising counter-force means located at said rear side of each of said belts.

4. A device according to claim 3, wherein said counter-force includes at least one roller.

5. A device according to claim 4, wherein said counter-force means comprise a single roller located at the rear side of a first belt of said pair of belts, and a pair of rollers located at the rear side of a second belt of said pair of belts.

6. A device according to claim 5, wherein at least one of said counter-force means is resiliently suspended.

7. A device according to claim 6, wherein said resiliently suspended counter-force means is mounted on a supportive bracket in common with one of said endless belts, said bracket being operatively coactive with a compacting force detecting device to detect a predetermined overload force.

8. A device according to claim 4, wherein at least one of said counter-force means is resiliently suspended.

9. A device according to claim 8, wherein said resiliently suspended counter-force means is mounted on a supportive bracket in common with one of said endless belts, said bracket being operatively coactive with a compacting force detecting device to detect a predetermined overload force.

10. A device according to claim 3, wherein at least one of said counter-force means is resiliently suspended.

11. A device according to claim 10, wherein said resiliently suspended counter-force means is mounted on a supportive bracket in common with one of said endless belts, said bracket being operatively coactive with a compacting force detecting device to detect a predetermined overload force.

12. A device according to claim 1, wherein each of said belts has a tread pattern of longitudinal arrays of tread blocks formed by longitudinal and transverse grooves in the belt material.

13. A device according to claim 12, wherein a plurality of said tread blocks have at least one of said metal studs provided therein.

\* \* \* \* \*

UNITED STATES PATENT AND TRADEMARK OFFICE
CERTIFICATE OF CORRECTION

PATENT NO.  : 5,522,311
DATED       : June 4, 1996
INVENTOR(S) : Johan Horsrud et al.

It is certified that error appears in the above-identified patent and that said Letters Patent is hereby corrected as shown below:

In Column 2, line 15, change "67" to --6,7--;

line 18, change "5" to --6--;

line 21, change "5'" to --6'--;

line 40, change "29" to --23--.

In Column 3, line 14, change "5, 7" to --6, 7--.

In Column 4, line 6, change "operating" to --cooperating--;

line 13, delete "or rubber";

line 18, before "includes" insert --means--.

Signed and Sealed this

Seventeenth Day of September, 1996

*Attest:*

BRUCE LEHMAN

*Attesting Officer*     Commissioner of Patents and Trademarks